(12) United States Patent
Chen et al.

(10) Patent No.: US 12,233,705 B2
(45) Date of Patent: Feb. 25, 2025

(54) HYBRID ALL-TERRAIN VEHICLE

(71) Applicant: SEGWAY TECHNOLOGY CO., LTD., Changzhou (CN)

(72) Inventors: Mingtang Chen, Changzhou (CN); Mingyong Wang, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 314 days.

(21) Appl. No.: 17/908,709

(22) PCT Filed: Mar. 4, 2021

(86) PCT No.: PCT/CN2021/079076
§ 371 (c)(1),
(2) Date: Sep. 1, 2022

(87) PCT Pub. No.: WO2021/175285
PCT Pub. Date: Sep. 10, 2021

(65) Prior Publication Data
US 2023/0182562 A1    Jun. 15, 2023

(30) Foreign Application Priority Data

Mar. 6, 2020  (CN) .......................... 202020268213.3
Dec. 14, 2020  (CN) .......................... 202023018008.0

(51) Int. Cl.
*B60K 11/04*  (2006.01)
*B60K 6/40*  (2007.10)

(52) U.S. Cl.
CPC ................ *B60K 11/04* (2013.01); *B60K 6/40* (2013.01); *B60Y 2200/20* (2013.01); *B60Y 2200/92* (2013.01)

(58) Field of Classification Search
CPC ......... B60K 11/04; B60K 11/02; B60K 11/06; B60K 11/08; B60K 11/085; B60K 6/40; B60Y 2200/20; B60Y 2200/92
See application file for complete search history.

(56) References Cited

U.S. PATENT DOCUMENTS

| | | | | |
|---|---|---|---|---|
| 8,261,861 | B2 * | 9/2012 | Takei | B60K 11/02 180/291 |
| 8,960,346 | B2 * | 2/2015 | Ogawa | B60K 11/06 180/68.1 |
| 2019/0375282 | A1 * | 12/2019 | Lee | H01M 8/04029 |

FOREIGN PATENT DOCUMENTS

| | | |
|---|---|---|
| CN | 201170220 Y | 12/2008 |
| CN | 203515762 U | 4/2014 |

(Continued)

OTHER PUBLICATIONS

International Search Report and Written Opinion dated Jun. 9, 2021 for Application No. PCT/CN2021/079076, 9 pages.

*Primary Examiner* — John D Walters
(74) *Attorney, Agent, or Firm* — Frost Brown Todd, LLP (57) ABSTRACT

A hybrid all-terrain vehicle includes an engine and a motor, the engine being configured to drive the motor or output power, the motor being configured to generate electric energy or output power; the motor defining a motor cooling channel; a motor radiator including a motor radiator liquid inlet and a motor radiator liquid outlet, the motor radiator liquid inlet, the motor cooling channel, and the motor radiator liquid outlet being communicated to form a motor cooling system; and a water pump connected in the motor cooling system, a height of the water pump from the ground being less than or equal to heights of two ends of the motor cooling channel from the ground; and/or the height of the water pump from the ground being less than or equal to (Continued)

heights of the motor radiator liquid inlet and the motor radiator liquid outlet from the ground.

20 Claims, 2 Drawing Sheets

(56) References Cited

FOREIGN PATENT DOCUMENTS

| | | |
|---|---|---|
| CN | 110492673 A | 11/2019 |
| CN | 209650052 U | 11/2019 |
| CN | 212979844 U | 4/2021 |
| WO | WO 2010/021292 | 2/2010 |

* cited by examiner

HYBRID ALL-TERRAIN VEHICLE

CROSS-REFERENCE TO RELATED APPLICATION

The present application is a national phase entry under 35 USC § 371 of International Application PCT/CN2021/079076, filed Mar. 4, 2021, which claims the benefit of and priority to Chinese Patent Application No. 202020268213.3 filed on Mar. 6, 2020 and Chinese Patent Application No. 2020230180080 filed on Dec. 14, 2020, the entire contents of which are incorporated herein by reference.

FIELD

The present application relates to the field of vehicle structure design technologies, and in particular, to a hybrid all-terrain vehicle.

BACKGROUND

In the related art, hybrid all-terrain vehicles need to use electric energy as a power source. These all-terrain vehicles need to use a motor as a power unit.

SUMMARY

Embodiments of the present application provide a hybrid all-terrain vehicle, including a frame; a front wheel located at a front side of the frame and a rear wheel located at a rear side of the frame; a power system fixed to the frame, the power system including an engine and a motor, the engine being configured to drive the motor to generate electric energy or to output power for the front wheel or the rear wheel, the motor being configured to generate electric energy under drive of the engine or to output power for the front wheel or the rear wheel, the motor defining a motor cooling channel; a motor radiator fixed to the frame and including a motor radiator liquid inlet and a motor radiator liquid outlet, the motor radiator liquid inlet, the motor cooling channel, and the motor radiator liquid outlet being sequentially communicated to form a motor cooling system; and a water pump connected to the motor cooling system, a height of the water pump from the ground being less than or equal to at least one of: heights of two ends of the motor cooling channel from the ground, and heights of the motor radiator liquid inlet and the motor radiator liquid outlet from the ground.

Embodiments of the present application further provide a hybrid all-terrain vehicle, including: a frame; an engine arranged on the frame; an axle arranged on the frame; a first motor drivingly connected to the axle, the first motor defining a first motor cooling channel; a second motor drivingly connected to the engine, the second motor defining a second motor cooling channel; and a motor radiator arranged on the frame, the motor radiator being provided with a motor radiator liquid inlet and a motor radiator liquid outlet, the motor radiator liquid inlet is communicated with a first end of the second motor cooling channel, the motor radiator liquid outlet is communicated with a first end of the first motor cooling channel, and a second end of the first motor cooling channel is communicated with a second end of the second motor cooling channel.

BRIEF DESCRIPTION OF THE DRAWINGS

In order to more clearly illustrate the technical solutions in embodiments of the present application or the prior art, the accompanying drawings used in the description of embodiments or the prior art will be briefly introduced below. It is apparent that, the accompanying drawings in the following description are only some embodiments of the present application, and other drawings can be obtained by those of ordinary skill in the art from the provided drawings without paying creative efforts.

DETAILED DESCRIPTION

The technical solutions in embodiments of the present application will be described clearly and fully below with reference to the accompanying drawings in embodiments of the present application. Apparently, the described embodiments are merely some of rather than all of embodiments of the present application. All other embodiments acquired by those skilled in the art without creative efforts based on embodiments of the present application shall fall within the protection scope of the present application.

As mentioned throughout the specification and claims, the term "include/comprise" is an open-ended term, and thus should be interpreted as "include/comprise, but not limited to." The term "substantially" means that in an acceptable error range, those skilled in the art can solve the technical problem in a certain error range and substantially achieve the technical effect.

Moreover, the term "connect" herein includes any direct or indirect connection means. Thus, if a first device is connected to a second device herein, it indicates that the first device may be directly connected to the second device, or indirectly connected to the second device through another device. Preferred embodiments for implementing the present application are described in the specification in the following, but the description is still only for the purpose of explaining the general principle of the present application and is not intended to limit the scope of the present application. The protection scope of the present application shall be based on the appended claims.

It should be understood that the term "and/or" used herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

It is to be noted that embodiments in the present application and technical features in embodiments may be combined with each other without conflict. The detailed description in specific embodiments should be construed as an explanation of the purpose of the present application and shall not be regarded as an undue restriction on the present application.

In the description of the present application, terms such as "front" and "rear" indicate an orientation or position relationship based on the orientation or position relationship illustrated in the drawings. It is to be understood that such orientation terms are only for convenience of description of the present application or for simplifying the description, and do not indicate or imply that the device or element referred to must have a particular orientation or be constructed and operated in a specific orientation, and hence cannot be construed as limitations on the present application.

In the related art, the motor may generate a large amount of heat during operation, and the heat is accumulated inside these all-terrain vehicles, which may affect the service life of the motor as well as driving safety.

Embodiment 1

Figure 1:
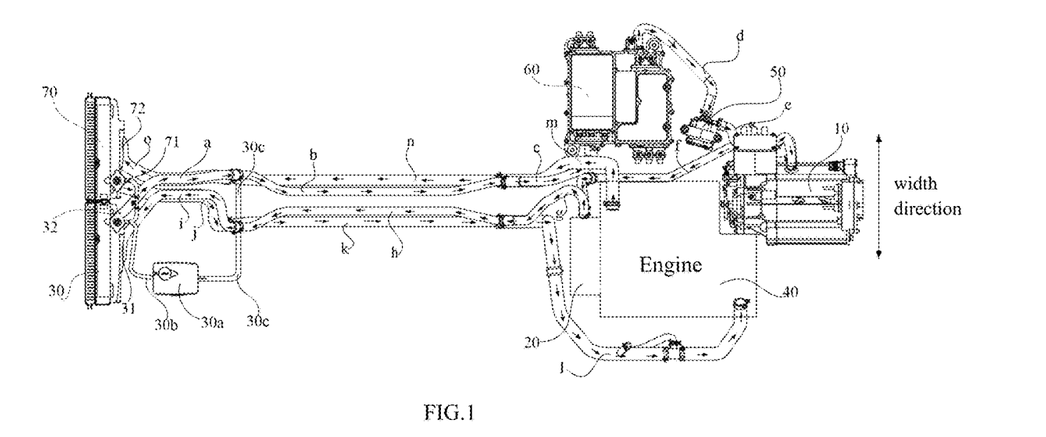
FIG. 1 is schematic structural diagram of a vehicle cooling system of a hybrid all-terrain vehicle according to an embodiment of the present application.

FIG. 1 is schematic structural diagram of a vehicle cooling system of a hybrid all-terrain vehicle according to an embodiment of the present application. Referring to FIG. 1, a hybrid all-terrain vehicle according to the present embodiment includes: a frame 9 (see FIG. 4), front wheels, rear wheels, a power system 100, a motor radiator 30, and a water pump 50.

The front wheels are located at a front side of the frame 9, and the rear wheels are located at a rear side of the frame 9. The power system may be fixed to the frame 9, and the power system includes a motor and an engine 40. The engine 40 is configured to drive the motor to generate electric energy or to output power for the front wheels or the rear wheels, and the motor is configured to generate electric energy under the drive of the engine 40 or to output power for the front wheels or the rear wheels.

The motor defines a motor cooling channel. The motor radiator 30 is fixed to the frame 9. The motor radiator 30 includes a motor radiator liquid inlet 31 and a motor radiator liquid outlet 32. The motor radiator liquid inlet 31, the motor cooling channel, and the motor radiator liquid outlet 32 are sequentially communicated to form a motor cooling system.

The water pump 50 is connected in the motor cooling system, and a height of the water pump 50 from the ground is less than or equal to heights of two ends of the motor cooling channel from the ground; and/or the height of the water pump 50 from the ground is less than or equal to heights of the motor radiator liquid inlet 31 and the motor radiator liquid outlet 32 from the ground. Thus, the water pump 50 is located at the lowest position of the motor cooling system. Since water flows down and the water pump 50 is arranged at the lowest position, the water pump 50 can quickly pump coolant at the motor radiator 30 to everywhere in the motor cooling system, thereby maximizing cooling efficiency.

In the hybrid all-terrain vehicle of the present embodiment, the hybrid all-terrain vehicle is powered by a hybrid of fuel (gasoline, diesel, etc.) and electric energy. More specifically, the vehicle in the present embodiment may be an extended-range vehicle.

In the hybrid all-terrain vehicle according to embodiments of the present application, the motor has the motor cooling channel, the motor radiator liquid inlet, the motor cooling channel, and the motor radiator liquid outlet are sequentially communicated to form the motor cooling system, and the water pump in the motor cooling system is located at the lowest position in the motor cooling system, so that the water pump can quickly pump coolant of the motor radiator towards the motor cooling system, the entire motor cooling system has higher circulation efficiency, improving heat dissipation efficiency of the motor is effectively improved, and the motor can dissipate heat quickly, thereby effectively prolonging the service life of the motor and ensuring driving safety of the all-terrain vehicle.

Specifically, the motor may include a first motor 10 and a second motor 20, The second motor 20 in the present embodiment may be connected to the engine 40, and generate electric energy under the drive of the engine 40. The second motor 20 may be electrically connected to the first motor 10, so that the first motor 10 outputs power for the front wheels or the rear wheels through the electric energy generated by the second motor 20. Specifically, the second motor 20 provides the first motor 10 with electric energy, and the first motor 10 is configured to be drivingly connected to an axle (not illustrated) of the vehicle, such that the power of the first motor 10 is transmitted to the wheels. The engine 40 may cause the second motor 20 to generate electricity, and the second motor 20 may provide the first motor 10 with electric energy, so that the range of the whole vehicle is increased.

The first motor 10 may define a first motor cooling channel, and the second motor 20 may define a second motor cooling channel. The first motor cooling channel may be a pipeline arranged in the first motor 10 or a cavity channel formed by an internal wall surface of the first motor 10, and the second motor cooling channel may be a pipeline arranged in the second motor 20 or a cavity channel formed by an internal wall surface of the second motor 20, which are not particularly limited in the present embodiment.

Specifically, the height of the water pump 50 from the ground is less than or equal to heights of two ends of the first motor cooling channel from the ground, and/or the height of the water pump 50 from the ground is less than or equal to heights of two ends of the second motor cooling channel from the ground.

The motor radiator liquid inlet 31, the first motor cooling channel, the second motor cooling channel, and the motor radiator liquid outlet 32 are communicated to form a motor cooling system. The coolant passes through the motor radiator 30, the first motor cooling channel, and the second motor cooling channel to cool and dissipate heat from the first motor 10 and the second motor 20.

The motor radiator 30 may be further connected to a charging tank 30a. The charging tank 30a is arranged on the frame 9. Specifically, one end of the charging tank 30a may be communicated to the motor radiator 30 through a ventilation pipe 30b, and the other end of the charging tank 30a may be connected to a charging pipe 30c. The charging pipe 30c may be arranged between the water pump 50 and the motor radiator liquid outlet 32.

Specifically, the charging tank 30a is configured mainly to replenish circulation fluid for a circulation cooling channel. The circulation fluid will not flow into the charging tank 30a when circulating in the circulation cooling channel. Since the other end of the charging pipe 30c is communicated between the water pump 50 and the motor radiator liquid outlet 32, the circulation fluid flowing into the circulation cooling channel from the charging tank 30a can flow towards the motor cooling system under the drive of the water pump 50 without passing through the motor radiator 30.

In other implementations, it is possible that the charging pipe 30c has one end communicated with the charging tank 30a and the other end communicated between the first end of the controller cooling channel and the motor radiator liquid outlet 32.

When the coolant circulates in the circulation cooling system, some bubbles are inevitably produced. Therefore, with the arrangement of the ventilation pipe 30b, the bubbles in the circulation cooling system can be effectively discharged to ensure that the coolant can have a good heat absorption function. In the present embodiment, the end of the ventilation pipe 30b communicated with the charging tank 30a may be communicated with a filler opening of the charging tank 30a to prevent flowing of the coolant into the ventilation pipe 30b due to a liquid level of the coolant in the charging tank 30a being higher than a set height of the end of the ventilation pipe 30b communicated with the charging tank 30a. Certainly, in other implementations, the charging tank 30a and the ventilation pipe 30b may not be provided.

The motor radiator liquid outlet 32 is communicated with a first end of the first motor cooling channel, the motor radiator liquid inlet 31 is communicated with a first end of the second motor cooling channel, and a second end of the first motor cooling channel is communicated with a second end of the second motor cooling channel. It is to be noted that "communicated" described herein includes direct communication as well as indirect connection. The motor radiator liquid outlet 32 is communicated with the first end of the first motor cooling channel, and the motor radiator liquid inlet 31 is communicated with the first end of the second motor cooling channel. Therefore, when the coolant circulates in the circulation cooling channel, the coolant flowing out of the radiator liquid outlet 32 first passes through the first motor 10, then passes through the second motor 20, and finally flows from the motor radiator liquid inlet 31 into the motor radiator 30 for heat dissipation. Thus, a large amount of heat generated by operation of the first motor 10 and the second motor 20 may be brought to the motor radiator 30 to dissipate the heat to the external environment through the motor radiator 30, so as to effectively dissipate heat for the first motor 10 and the second motor 20, thereby prolonging the service life of the motor and ensuring driving safety of the hybrid all-terrain vehicle.

In addition, the second motor 20 is configured to generate electricity, which converts mechanical energy into electric energy, while the first motor 10 is used as a drive motor, and the heat generated by the second motor 20 for generating electricity is more than the heat generated by the first motor 10. Therefore, in the motor cooling system of the present embodiment, the coolant first absorbs the heat generated by the first motor 10 at a relatively low temperature, and then absorbs the heat generated by the second motor 20 at a relatively high temperature, so that heat transfer efficiency is maximized and a cooling effect is optimized.

Further, as illustrated in FIG. 1, the vehicle cooling system in the present embodiment further includes a controller 60, the controller 60 is connected in the motor cooling system, the controller 60 defines a controller cooling channel, and the height of the water pump 50 from the ground is less than or equal to heights of two ends of the controller cooling channel from the ground. The controller cooling channel may be connected in series between the motor radiator liquid outlet 32 and the first motor cooling channel. The motor radiator liquid outlet 32 is communicated with a first end of the controller cooling channel, and a second end of the controller cooling channel is communicated with the first end of the first motor cooling channel.

In the present embodiment, the controller 60 may be configured to cooperate with the first motor 10 and the second motor 20. The controller 60 may have a variety of control functions. For example, the controller 60 may have a first control end and a second control end. The first control end is connected to the first motor 10, and the second control end is connected to the second motor 20, so that the electric energy generated by the second motor 20 is modulated by the controller 60 and then transferred to the first motor 10. In addition, the controller 60 may be further electrically connected to other electric control components of the whole vehicle to realize the control over the whole vehicle.

In some embodiments, the motor radiator may be located at the front side of the frame 9. The engine 40 is fixed to the frame 9 and located behind the motor radiator, the second motor 20 is connected to the engine and located in front of the engine, the first motor 10 is located behind the engine, and the controller 60 is located at a side of the engine 40.

The controller 60 may also generate a certain amount of heat in an operating state. Therefore, the controller 60 defines the controller cooling channel, and the controller cooling channel is connected in the motor cooling system, so that cooling water of the motor cooling system passes through the controller 60 to dissipate heat for the controller 60, thereby prolonging the service life of the controller 60 and preventing loss of control caused by damage to and sudden failure of the controller 60 due to a high temperature.

Further, the heat generated by the controller 60 is less than the heat generated by the first motor 10 and the second motor 20. Therefore, the controller 60 in the present embodiment is arranged between the motor radiator 30 and the first motor 10, and the coolant, which has released heat at the motor radiator 30, flows out of the motor radiator 30 and sequentially passes through the controller 60, the first motor 10, and the second motor 20, and then goes back to the motor radiator 30. The heat generated by the operation of the controller 60 is less than the heat generated by the operation of the first motor 10 which is less than the heat generated by the operation of the second motor 20, so that the controller 60, the first motor 10, and the second motor 20 can dissipate heat reasonably and effectively, and the cooling effect of the coolant is optimized.

On the basis of the above embodiment, further, as illustrated in FIG. 1, the water pump 50 may be arranged between the second end of the controller cooling channel and the first end of the first motor cooling channel. The arrangement of the water pump 50 can accelerate circulation efficiency of coolant and ensure a heat dissipation speed. The water pump 50 is arranged in front of the first motor 10 and the second motor 20. Since the first motor 10 and the second motor 20 generate more heat when operating and the water pump 50 is arranged at a position close to the first motor 10 and the second motor 20, the coolant can be quickly pumped to the first motor 10 and the second motor 20 at higher temperatures, enabling the first motor 10 and the second motor 20 to dissipate heat quickly.

Figure 2:
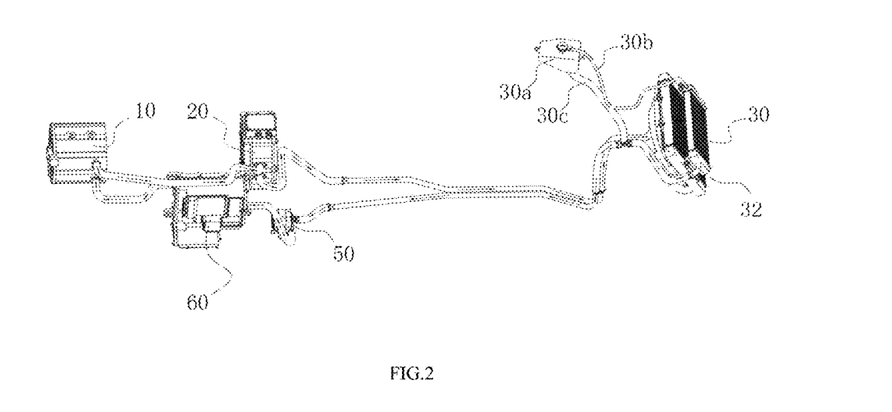
FIG. 2 is a schematic diagram of a fitting relationship between a liquid cooling and heat-dissipation system and a power unit of another hybrid all-terrain vehicle according to an embodiment of the present application, in which an arrow in a circulation channel indicates a circulation direction of circulation fluid in the circulation channel, and a further radiator is also illustrated.

Certainly, in another embodiment, as illustrated in FIG. 2, the water pump 50 may be arranged between the motor radiator liquid outlet 32 and the first end of the controller cooling channel, and the circulation fluid after heat dissipation by the motor radiator 30 can flow to the controller 60, the first motor 10, and the second motor 20 as soon as possible under the drive of the water pump 50, so as to improve heat dissipation speeds of the controller 60, the first motor 10, and the second motor 20. Or, the water pump 50 is arranged between the second end of the second motor cooling channel and the second end of the first motor cooling channel; or the water pump 50 is arranged between the motor radiator liquid inlet 31 and the first end of the second motor cooling channel. The water pump 50 may be arranged at any position in the motor cooling system, provided that the coolant at the motor radiator 30 can be quickly pumped to the motor cooling system, which is not particularly limited in the present embodiment.

Further, as illustrated in FIG. 1, the hybrid all-terrain vehicle according to the present embodiment further includes an engine cooling channel, and the height of the water pump 50 from the ground is less than or equal to heights of two ends of the engine cooling channel from the ground.

The engine cooling channel includes an engine radiator 70. The engine radiator 70 includes an engine radiator liquid inlet 71 and an engine radiator liquid outlet 72. The engine 40 defines an engine cooling channel. The engine radiator liquid outlet 72, a first end of the engine cooling channel, a second end of the engine cooling channel, and the engine radiator liquid inlet 71 are sequentially communicated to form an engine cooling system.

The engine 40 may also generate a large amount of heat during the operation, and more heat is generated. Therefore, with the separate arrangement of the engine cooling system for dissipating heat for the engine 40, cooling of the engine 40 and cooling of the motor are independent of each other and do not affect each other, so as to effectively improve heat dissipation effects of the engine 40 and the motor, enabling the vehicle to have sufficient power.

Further, as illustrated in FIG. 1, the motor cooling system and the engine cooling system are arranged side by side along a width direction of the vehicle. The so-called "the motor cooling system and the engine cooling system are arranged side by side" means that the entirety is arranged side by side, and not all the parts are arranged side by side along the width direction of the vehicle. In the present embodiment, at least the motor radiator and the engine radiator 70 may be arranged side by side along the width direction of the vehicle, with a compact structure and reasonable layout. More specifically, the engine radiator 70 and the motor radiator are symmetrically arranged with respect to a longitudinal central plane of the hybrid all-terrain vehicle, so that mass distribution of the whole vehicle is as even as possible to improve balance of the whole vehicle and driving safety to some extent.

Further, the engine cooling channel may be communicated with the engine radiator liquid outlet 72 through an engine water inlet pipe, the engine 40 is provided with an oil cooler (not illustrated), and the oil cooler may be communicated with the engine water inlet pipe. Specifically, the oil cooler may be communicated with the engine water inlet pipe through an oil cooling pipe 73, and the coolant flowing out of the engine radiator liquid outlet 72 has a part directly entering the engine water inlet pipe and the other part entering the oil cooler, so as to cool the oil inside the engine 40 and further help heat dissipation of the engine 40.

It is to be noted that in the present embodiment, preferably, the oil cooling pipe 73 may be a rubber pipe for easy assembly and connection.

In the present embodiment, a pipeline in the motor cooling system may include at least one rigid pipeline and at least one flexible pipeline. Similarly, a pipeline in the engine cooling system may include at least one rigid pipeline and at least one flexible pipeline. A pipeline for connecting various components may include at least one rigid pipeline and at least one flexible pipeline. The rigid pipeline helps to limit an extension path of the pipeline, while the flexible pipeline can facilitate mounting of the pipeline. Therefore, the flexible pipeline may be connected at a connecting port of the component and the rigid pipeline may be connected at another position. In particular, when two components are close to each other, a connecting pipeline between the two components may be a flexible pipeline to facilitate mounting and connection. When the two components are far apart, the connecting pipeline between the two components may be a rigid pipeline, or a pipeline combined by a rigid pipeline and a flexible pipeline, so that the pipeline between the two components far apart can be extended in a predetermined path without confusion. It is to be noted that the "component" described above is one or more of the following components: the motor radiator 30, the first motor 10, the second motor 20, the water pump 50, the controller 60, the engine radiator 70, and the engine 40.

It is to be noted that the rigid pipeline according to the present embodiment may be an aluminum pipe, aluminum material has better dissipates heat performance, and part of the heat of the coolant can be taken away through the aluminum pipe, so as to further improve the heat dissipation effect.

In one preferred embodiment of the present application, the motor radiator liquid outlet 32 is connected to a first rubber pipe a, the first rubber pipe a is connected to a first aluminum pipe b, the first aluminum pipe b is communicated with the first end of the controller cooling channel through a second rubber pipe c, the second end of the controller cooling channel is communicated with the water pump 50 through a third rubber pipe d, the water pump 50 is communicated with the first end of the first motor cooling channel through a fourth rubber pipe e, the second end of the first motor cooling channel is communicated with the second end of the second motor cooling channel through a second aluminum pipe f, the first end of the second motor cooling channel is communicated with a fifth rubber pipe g, the fifth rubber pipe g is communicated with a third aluminum pipe h, the third aluminum pipe h is communicated with a sixth rubber pipe i, and the sixth rubber pipe i is communicated to the motor radiator liquid inlet 31.

The engine radiator liquid outlet 72 is connected to a seventh rubber pipe j, the seventh rubber pipe j is communicated with a fourth aluminum pipe k, the fourth aluminum pipe k is communicated with an eighth rubber pipe l, the eighth rubber pipe l is communicated with a first end of the engine, a second end of the engine is communicated with a ninth rubber pipe m, the ninth rubber pipe m is communicated with a fifth aluminum pipe n, the fifth aluminum pipe n is communicated with a tenth rubber pipe o, and the tenth rubber pipe o is communicated with the engine radiator liquid inlet 71.

It is to be noted that the eighth rubber pipe l is the engine water inlet pipe communicated with the oil cooling pipe 73.

Figure 3:
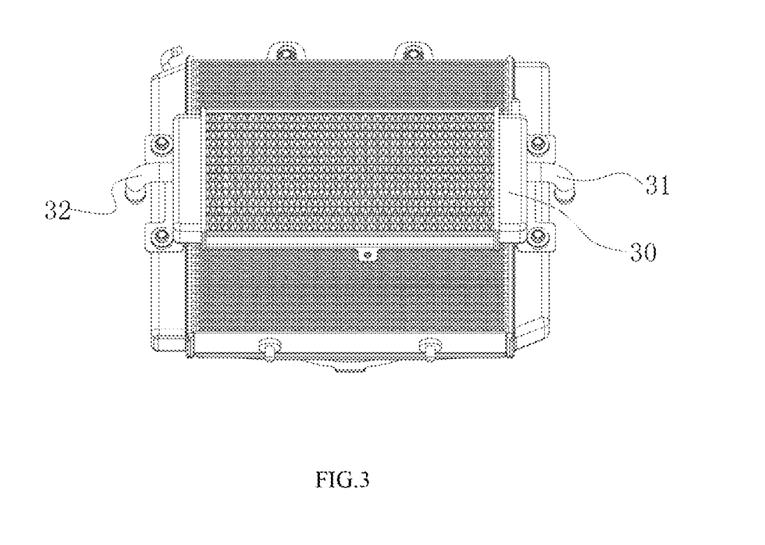
FIG. 3 is a schematic diagram of a connection relationship between the motor radiator and the further radiator illustrated in FIG. 2.
Figure 4:
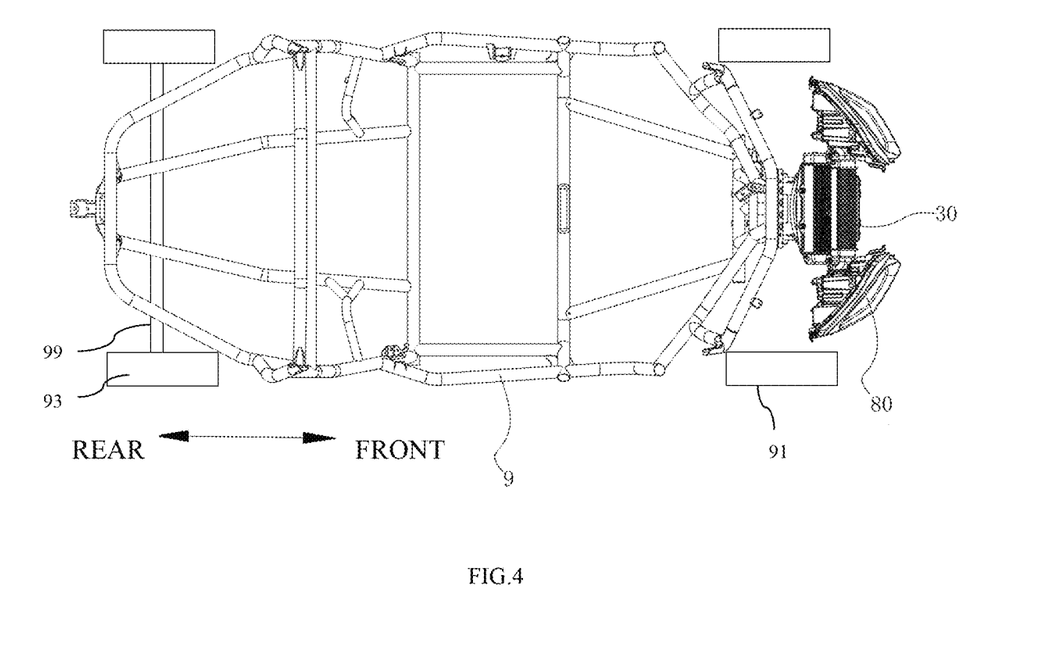
FIG. 4 is a schematic diagram of mounting positions of the motor radiator and the further radiator illustrated in FIG. 2 on a frame.

Embodiment 2, embodiments of the present application also provide a hybrid all-terrain vehicle. Referring to FIG. 2 to FIG. 4, the hybrid all-terrain vehicle includes: a frame 9, an engine 40 (see FIG. 1), a first motor 10, an axle (not illustrated), a second motor 20, and a motor radiator 30. The engine 40 is arranged on the frame 9. The second motor 20 is drivingly connected to the engine 40, and the second motor 20 defines a second motor cooling channel. The axle is arranged on the frame 9. The first motor 10 is drivingly connected to the axle, and the first motor 10 defines a first motor cooling channel. The motor radiator 30 is arranged on the frame 9. The motor radiator 30 is provided with a motor radiator liquid inlet 31 and a motor radiator liquid outlet 32. The motor radiator liquid inlet 31 is communicated with a first end of the second motor cooling channel, the motor radiator liquid outlet 32 is communicated with a first end of the first motor cooling channel, and a second end of the first motor cooling channel is communicated with a second end of the second motor cooling channel.

In the present embodiment, the motor radiator 30 is arranged at a front end of the frame. In some embodiments, the hybrid all-terrain vehicle further includes two headlights 80, and the two headlights 80 are respectively arranged at two sides of the motor radiator 30. That is, the motor radiator 30 is arranged right in front of a cockpit of the hybrid all-terrain vehicle, so as to facilitate the heat dissipation of the motor radiator 30. In other implementations, the motor radiator 30 may also be arranged at a rear end or a side surface of the frame 9 or other positions, provided that the motor radiator 30 can dissipate heat effectively.

In the present embodiment, the motor radiator liquid inlet 31 and the motor radiator liquid outlet 32 are respectively arranged in two opposite side surfaces of the motor radiator 30, the first motor cooling channel, the motor radiator liquid inlet 31, the motor radiator liquid outlet 32, and second motor cooling channel are communicated with one another so as to form a circulation cooling channel in the hybrid all-terrain vehicle. The motor radiator liquid inlet 31 is communicated with the first end of the second motor cooling channel, and the motor radiator liquid outlet 32 is communicated with the first end of the first motor cooling channel. Therefore, when the coolant circulates in the circulation cooling channel, the coolant flowing out of the motor radiator liquid outlet 32 first passes through the first motor 10, then passes through the second motor 20, and finally flows from the motor radiator liquid inlet 31 into the motor radiator 30 for heat dissipation. Thus, heat generated by the second motor 20 and the first motor 10 may be brought to the motor radiator 30 to dissipate the heat to the external environment through the motor radiator 30, so as to effectively dissipate heat for the second motor 20 and the first motor 10, thereby prolonging the service life of the motor and ensuring driving safety of the hybrid all-terrain vehicle.

In addition, the heat generated by the second motor 20 for generating electricity is more than the heat generated by the first motor 10. Therefore, in the circulation cooling channel of the present embodiment, the circulation fluid first absorbs the heat generated by the first motor 10 at a relatively low temperature, and then absorbs the heat generated by the second motor 20 at a relatively high temperature, so as to ensure that the first motor 10 and the second motor 20 can dissipate heat effectively.

In some embodiments, as illustrated in FIG. 4, the hybrid all-terrain vehicle further includes a further radiator. The further radiator is fixed to the motor radiator 30, and the motor radiator 30 is arranged at a front side of the further radiator along a front-rear direction. For example, the further radiator may be an engine radiator 70.

Other structures in Embodiment 2 are basically the same as the structure in Embodiment 1. Therefore, details are not described herein.

In view of the above problems, a hybrid all-terrain vehicle is proposed in the present application to solve the above problems or at least partially solve the above problems.

Embodiments of the present application provide a hybrid all-terrain vehicle, including a frame; a front wheel located at a front side of the frame and a rear wheel located at a rear side of the frame; a power system fixed to the frame, the power system including an engine and a motor, the engine being configured to drive the motor to generate electric energy or to output power for the front wheel or the rear wheel, the motor being configured to generate electric energy under drive of the engine or to output power for the front wheel or the rear wheel; the motor, the motor defining a motor cooling channel; a motor radiator fixed to the frame and including a motor radiator liquid inlet and a motor radiator liquid outlet, the motor radiator liquid inlet, the motor cooling channel, and the motor radiator liquid outlet being sequentially communicated to form a motor cooling system; and a water pump connected to the motor cooling system, a height of the water pump from the ground being less than or equal to heights of two ends of the motor cooling channel from the ground; and/or the height of the water pump from the ground being less than or equal to heights of the motor radiator liquid inlet and the motor radiator liquid outlet from the ground.

In at least one embodiment, the motor includes a first motor and a second motor, the second motor being connected to the engine and generating electric energy under the drive of the engine, the first motor outputting power for the front wheel or the rear wheel through the electric energy generated by the second motor; the first motor defining a first motor cooling channel, the second motor defining a second motor cooling channel; and the height of the water pump from the ground is less than or equal to heights of two ends of the first motor cooling channel from the ground, and/or the height of the water pump from the ground is less than or equal to heights of two ends of the second motor cooling channel from the ground.

In at least one embodiment, the hybrid all-terrain vehicle further includes a controller, the controller being connected in the motor cooling system, the controller defining a controller cooling channel, the height of the water pump from the ground being less than or equal to heights of two ends of the controller cooling channel from the ground.

In at least one embodiment, the engine defines an engine cooling channel, and the height of the water pump from the ground is less than or equal to heights of two ends of the engine cooling channel from the ground.

In at least one embodiment, the motor radiator liquid outlet is communicated with a first end of the first motor cooling channel, the motor radiator liquid inlet is communicated with a first end of the second motor cooling channel, and a second end of the first motor cooling channel is communicated with a second end of the second motor cooling channel.

In at least one embodiment, the controller cooling channel is connected in series between the motor radiator liquid outlet and the first motor cooling channel; the motor radiator liquid outlet is communicated with a first end of the controller cooling channel, and a second end of the controller cooling channel is communicated with the first end of the first motor cooling channel.

In at least one embodiment, the water pump is arranged between the second end of the controller cooling channel and the first end of the first motor cooling channel; or the water pump is arranged between the motor radiator liquid outlet and the first end of the controller cooling channel; or the water pump is arranged between the second end of the second motor cooling channel and the second end of the first motor cooling channel; or the water pump is arranged between the motor radiator liquid inlet and the first end of the second motor cooling channel.

In at least one embodiment, the hybrid all-terrain vehicle further includes an engine radiator, the motor radiator and the engine radiator being arranged side by side along a width direction of the vehicle.

In at least one embodiment, the engine radiator and the motor radiator are symmetrically arranged with respect to a longitudinal central plane of the hybrid all-terrain vehicle.

In at least one embodiment, the motor radiator is located at the front side of the frame; the engine is fixed to the frame and located behind the motor radiator; and the second motor is connected to the engine and located in front of the engine, the first motor is located behind the engine, and the controller is located at a side of the engine.

In the hybrid all-terrain vehicle according to embodiments of the present application, the motor has the motor cooling channel, the motor radiator liquid inlet, the motor cooling channel, and the motor radiator liquid outlet are sequentially communicated to form the motor cooling system, and the water pump in the motor cooling system is located at the lowest position in the motor cooling system so that the water pump can quickly pump coolant of the motor radiator towards the motor cooling system, the entire motor cooling system has higher circulation efficiency, heat dissipation efficiency of the motor is effectively improved, and the motor can dissipate heat quickly, thereby effectively prolonging the service life of the motor and ensuring driving safety of the all-terrain vehicle.

Embodiments of the present application further provide a hybrid all-terrain vehicle, including: a frame; an engine arranged on the frame; an axle arranged on the frame; a first motor drivingly connected to the axle, the first motor defining a first motor cooling channel; a second motor drivingly connected to the engine, the second motor defining a second motor cooling channel; and a motor radiator arranged on the frame, the motor radiator being provided with a motor radiator liquid inlet and a motor radiator liquid outlet, the motor radiator liquid inlet is communicated with a first end of the second motor cooling channel, the motor radiator liquid outlet is communicated with a first end of the first motor cooling channel, and a second end of the first motor cooling channel is communicated with a second end of the second motor cooling channel.

In at least one embodiment, the hybrid all-terrain vehicle further includes a controller, the controller defining a controller cooling channel, the controller cooling channel having a first end connected to the motor radiator liquid outlet and a second end connected to the first end of the first motor cooling channel.

In at least one embodiment, the hybrid all-terrain vehicle further includes a water pump, the water pump being arranged between the motor radiator liquid outlet and the first end of the controller cooling channel.

In at least one embodiment, the hybrid all-terrain vehicle further includes a water pump, the water pump being arranged between the motor radiator liquid inlet and the first end of the second motor cooling channel.

In at least one embodiment, the hybrid all-terrain vehicle further includes: a charging tank arranged on the frame; and a charging pipe, the charging pipe having one end communicated with the charging tank and the other end communicated between the water pump and the motor radiator liquid outlet.

In at least one embodiment, the hybrid all-terrain vehicle further includes: a charging tank arranged on the frame; and a charging pipe, the charging pipe having one end communicated with the charging tank and the other end communicated between the first end of the controller cooling channel and the motor radiator liquid outlet.

In at least one embodiment, the hybrid all-terrain vehicle further includes a ventilation pipe, the ventilation pipe being communicated with the charging tank and the motor radiator.

In at least one embodiment, the motor radiator is located at a front end of the frame.

In at least one embodiment, the hybrid all-terrain vehicle further includes two headlights, the two headlights being respectively arranged at two sides of the motor radiator.

In at least one embodiment, the motor radiator liquid inlet and the motor radiator liquid outlet are respectively arranged in two opposite side surfaces of the motor radiator.

Embodiments of the present application provide a hybrid all-terrain vehicle, in which the first motor, the second motor, and the motor radiator are communicated with one another to form a circulation cooling channel, circulation fluid circulating in the circulation cooling channel may be used to continuously bring heat generated by the first motor and the second motor to the motor radiator, and the heat is dissipated to an external environment through the motor radiator. Thus, the first motor and the second motor can dissipate heat effectively, the service life of the first motor and the second motor can be prolonged, and driving safety of the hybrid all-terrain vehicle can be ensured.

Without contradiction, those skilled in the art can integrate and combine different embodiments or examples and features of the different embodiments or examples described in this specification.

Finally, it should be noted that the above embodiments are merely intended to describe the technical solutions of the present application instead of limiting the present application. Although the present application is described in detail with reference to the above embodiments, those of ordinary skill in the art should understand that they can still make modifications to the technical solutions described in the above embodiments, or make equivalent replacements to some of the technical features in the technical solutions; and these modifications or replacements do not make the essence of corresponding technical solutions depart from the spirit and scope of the technical solutions of embodiments of the present application.

What is claimed is:

1. A hybrid all-terrain vehicle, comprising:
   a frame;
   a front wheel located at a front side of the frame and a rear wheel located at a rear side of the frame;
   a power system fixed to the frame, the power system comprising an engine and a motor, the engine being configured to drive the motor to generate electric energy or to output power for the front wheel or the rear wheel, the motor being configured to generate electric energy under drive of the engine or to output power for the front wheel or the rear wheel, the motor defining a motor cooling channel;
   a motor radiator fixed to the frame and comprising a motor radiator liquid inlet and a motor radiator liquid outlet, the motor radiator liquid inlet, the motor cooling channel, and the motor radiator liquid outlet being sequentially communicated to form a motor cooling system;
   a water pump connected in the motor cooling system, a height of the water pump from the ground being less than or equal to at least one of:
   heights of two ends of the motor cooling channel from the ground; and
   heights of the motor radiator liquid inlet and the motor radiator liquid outlet from the ground; and
   a controller, wherein the controller is connected in the motor cooling system, the controller defines a controller cooling channel, and the height of the water pump from the ground being less than or equal to heights of two ends of the controller cooling channel from the ground;

wherein the motor comprises a first motor and a second motor, the second motor is connected to the engine and generates electric energy under the drive of the engine, and the first motor outputs power for the front wheel or the rear wheel through the electric energy generated by the second motor;

wherein the first motor defines a first motor cooling channel, and the second motor defines a second motor cooling channel; and wherein the height of the water pump from the ground is less than or equal to at least one of:

heights of two ends of the first motor cooling channel from the ground, and heights of two ends of the second motor cooling channel from the ground.

2. The hybrid all-terrain vehicle according to claim 1, wherein the engine defines an engine cooling channel, and the height of the water pump from the ground is less than or equal to heights of two ends of the engine cooling channel from the ground.

3. The hybrid all-terrain vehicle according to claim 1, wherein the motor radiator liquid outlet is communicated with a first end of the first motor cooling channel, the motor radiator liquid inlet is communicated with a first end of the second motor cooling channel, and a second end of the first motor cooling channel is communicated with a second end of the second motor cooling channel.

4. The hybrid all-terrain vehicle according to claim 3, wherein the controller cooling channel is connected in series between the motor radiator liquid outlet and the first motor cooling channel; and wherein the motor radiator liquid outlet is communicated with a first end of the controller cooling channel, and a second end of the controller cooling channel is communicated with the first end of the first motor cooling channel.

5. The hybrid all-terrain vehicle according to claim 4, wherein the water pump is arranged between the second end of the controller cooling channel and the first end of the first motor cooling channel;

or the water pump is arranged between the motor radiator liquid outlet and the first end of the controller cooling channel;

or the water pump is arranged between the second end of the second motor cooling channel and the second end of the first motor cooling channel;

or the water pump is arranged between the motor radiator liquid inlet and the first end of the second motor cooling channel.

6. The hybrid all-terrain vehicle according to claim 1, further comprising:

an engine radiator, wherein the motor radiator and the engine radiator are arranged side by side along a width direction of the vehicle.

7. The hybrid all-terrain vehicle according to claim 6, wherein the engine radiator and the motor radiator are symmetrically arranged with respect to a longitudinal central plane of the hybrid all-terrain vehicle.

8. The hybrid all-terrain vehicle according to claim 1, wherein the motor radiator is located at the front side of the frame;

the engine is fixed to the frame and located behind the motor radiator; and the second motor is connected to the engine and located in front of the engine, the first motor is located behind the engine, and the controller is located at a side of the engine.

9. A hybrid all-terrain vehicle, comprising:

a frame;

an engine arranged on the frame;

an axle arranged on the frame;

a first motor drivingly connected to the axle, the first motor defining a first motor cooling channel;

a second motor drivingly connected to the engine, the second motor defining a second motor cooling channel;

a motor radiator arranged on the frame, the motor radiator being provided with a motor radiator liquid inlet and a motor radiator liquid outlet, wherein the motor radiator liquid inlet is communicated with a first end of the second motor cooling channel, the motor radiator liquid outlet is communicated with a first end of the first motor cooling channel, and a second end of the first motor cooling channel is communicated with a second end of the second motor cooling channel; and a controller, wherein the controller defines a controller cooling channel, and the controller cooling channel has a first end connected to the motor radiator liquid outlet and a second end connected to the first end of the first motor cooling channel.

10. The hybrid all-terrain vehicle according to claim 9, further comprising a water pump, wherein the water pump is arranged between the motor radiator liquid outlet and the first end of the controller cooling channel.

11. The hybrid all-terrain vehicle according to claim 9, further comprising a water pump, wherein the water pump is arranged between the motor radiator liquid inlet and the first end of the second motor cooling channel.

12. The hybrid all-terrain vehicle according to claim 11, further comprising:

a charging tank arranged on the frame; and a charging pipe, the charging pipe having one end communicated with the charging tank and the other end communicated between the first end of the controller cooling channel and the motor radiator liquid outlet.

13. The hybrid all-terrain vehicle according to claim 9, wherein the motor radiator is located at a front end of the frame.

14. The hybrid all-terrain vehicle according to claim 13, wherein the hybrid all-terrain vehicle further comprises two headlights, and the two headlights are respectively arranged at two sides of the motor radiator.

15. The hybrid all-terrain vehicle according to claim 13, wherein the motor radiator liquid inlet and the motor radiator liquid outlet are respectively arranged in two opposite side surfaces of the motor radiator.

16. A hybrid all-terrain vehicle, comprising:

a frame;

an engine arranged on the frame;

an axle arranged on the frame;

a first motor drivingly connected to the axle, the first motor defining a first motor cooling channel;

a second motor drivingly connected to the engine, the second motor defining a second motor cooling channel;

a motor radiator arranged on the frame, the motor radiator being provided with a motor radiator liquid inlet and a motor radiator liquid outlet, wherein the motor radiator liquid inlet is communicated with a first end of the second motor cooling channel, the motor radiator liquid outlet is communicated with a first end of the first motor cooling channel, and a second end of the first motor cooling channel is communicated with a second end of the second motor cooling channel;

a water pump, wherein the water pump is arranged between the motor radiator liquid inlet and the motor radiator liquid outlet;

a charging tank arranged on the frame; and a charging pipe, the charging pipe having one end communicated with the charging tank and the other end communicated between the water pump and the motor radiator liquid outlet.

17. The hybrid all-terrain vehicle according to claim 16, further comprising a ventilation pipe, wherein the ventilation pipe is communicated with the charging tank and the motor radiator.

18. The hybrid all-terrain vehicle according to claim 16, wherein the motor radiator is located at a front end of the frame.

19. The hybrid all-terrain vehicle according to claim 18, wherein the hybrid all-terrain vehicle further comprises two headlights, and the two headlights are respectively arranged at two sides of the motor radiator.

20. The hybrid all-terrain vehicle according to claim 18, wherein the motor radiator liquid inlet and the motor radiator liquid outlet are respectively arranged in two opposite side surfaces of the motor radiator.

* * * * *